United States Patent [19]

Meyn

[11] 4,155,146
[45] May 22, 1979

[54] APPARATUS FOR CUTTING OUT THE VENT OF A FOWL

[76] Inventor: Pieter Meyn, 68 Noordeinde, Oostzaan, Netherlands

[21] Appl. No.: 863,955

[22] Filed: Dec. 23, 1977

[30] Foreign Application Priority Data

Jan. 12, 1977 [NL] Netherlands .................. 7700233
Jan. 24, 1977 [NL] Netherlands .................. 7700677

[51] Int. Cl.$^2$ .................................................. A22C 21/00
[52] U.S. Cl. .................................................. 17/11
[58] Field of Search .................................... 17/11 R

[56] References Cited

U.S. PATENT DOCUMENTS

| | | | |
|---|---|---|---|
| 3,958,302 | 5/1976 | Meyn | 17/11 |
| 3,958,303 | 5/1976 | Scheier et al. | 17/11 X |
| 4,023,237 | 5/1977 | Meyn | 17/11 |

*Primary Examiner*—Willie G. Abercrombie
*Attorney, Agent, or Firm*—Jones, Thomas & Askew

[57] ABSTRACT

Automatic vent cutting machine for poultry, cooperating with an overhead conveyor carrying birds by the ankle joints, having at least one cutting unit moving along with the conveyor and reciprocatable towards and away from the bird, the cutting unit having a hollow cylindrical knife concentrically rotatable about a center pin, in which the knife is axially reciprocatable relative to the center pin, and in which the tip of the center pin to be inserted into the vent opening of the bird is provided with a tapering external helical flight and is rotatable in a direction opposite to the rotation of the knife, so that in operation first the tip of the slowly rotating center pin is inserted, after which the fastly rotating knife shoots out over the tip of the center pin and cuts out the vent, during which the friction between the rotating tip of the center pin and the vent prevents the vent from rotating with the knife, then the knife and the center pin are stopped and retracted from the bird, thereby pulling the cut out vent, which is locked between the knife and the flight of the center pin, out of the bird together with the gut attached to the vent, and finally the vent is released by pulling the knife back from the tip of the center pin. The machine further has for each cutting unit two cooperating positioning members for positioning the bird relative to the cutting unit, one of which bears on the breast of the bird and pushes it under the cutting unit, whereas the other positioning member bears on the back of the bird and pushes it back briefly at the moment the tip of the center pin and/or the knife is inserted in order to bring the vent opening staight below the center pin, respectively in order to bring the rose-bud within the radius of the knife.

14 Claims, 11 Drawing Figures

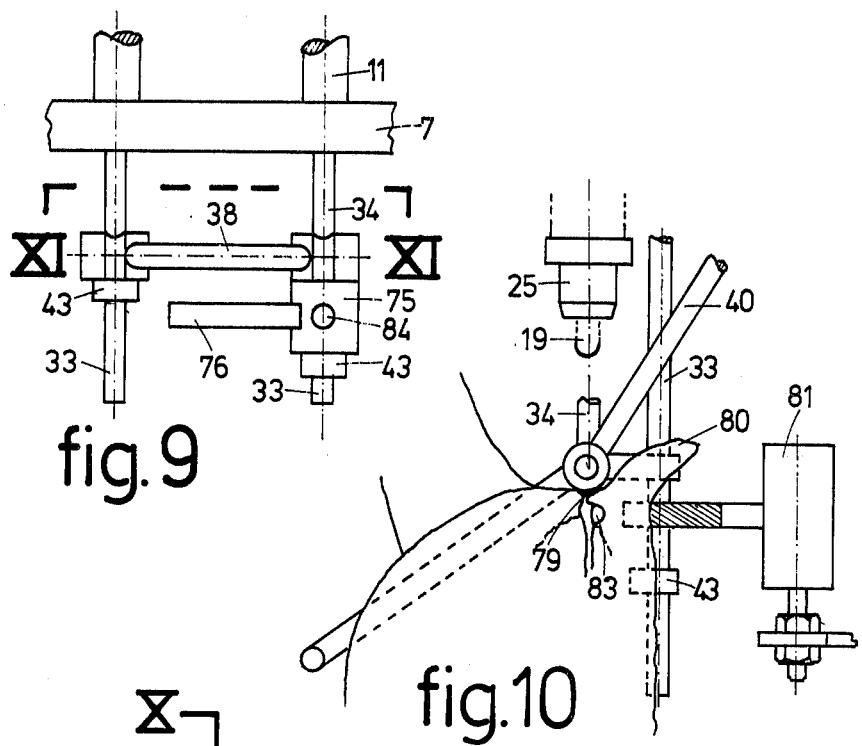
fig.9
fig.10
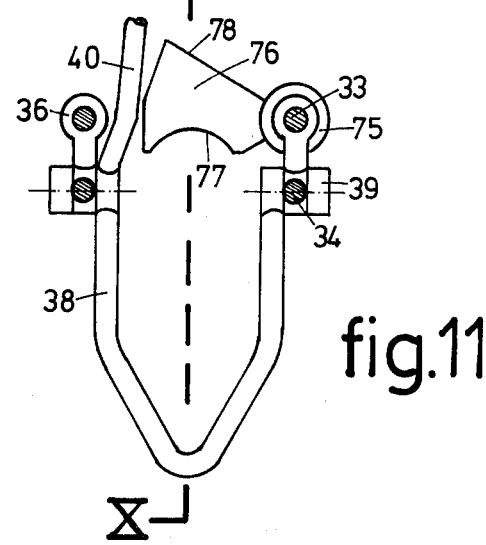
fig.11

APPARATUS FOR CUTTING OUT THE VENT OF A FOWL

BACKGROUND OF THE INVENTION

The invention relates in general to an apparatus for cutting out the vent of a fowl, having a hollow cylindrical knife concentrically rotatable about a center pin, which is adapted to be inserted into the fowl's vent opening in order to center the vent relative to the knife, and more in particular to an apparatus of this kind adapted to cooperate with an overhead conveyor with shackles for transporting the birds to be processed, which are hanging by the ankle joints from the conveyor shackles.

With any such apparatus, which serves to make a circular cut in the skin of the fowl around it's vent in order to sever the viscera from the skin, the problem always is that it must be avoided, that the viscera are touched by the knife and also that the vent, once it is cut out, rotates with the knife, which will twist and might rupture the gut attached to the vent. The regulations on hygiene in processing plants and in particular on prevention of cross contamination are so strict in many countries, that a bird of which the viscera are damaged is rejected as unfit for human consumption.

For this reason apparatusses were developed in which was tried to hold the vent against rotating with the knife and in many instances it was also tried to pull up the vent towards the knife, so that the knife would not have to be inserted into the fowl very deep, thereby lessening the danger of touching the underlying viscera with the knife.

In a number of known apparatusses vacuum is used to hold the vent, which however not only has the disadvantage that vacuum conduits easily get clogged, since apart from the vent also the faeces are sucked up, but is also undesirable from a hygienic point of view, especially since very often compressed air is used to clear clogged vacuum conduits, which could cause aerosol contamination.

In other known apparatusses and especially in automatic apparatusses cooperating with the overhead conveyor, mechanical means are used for pulling up and/or holding the vent. Although in this manner the use of vacuum is avoided, as a rule such mechanical means are very complicated, which leads to an elaborate and expensive construction and because of the great number of moving parts involved, such apparatusses again are susceptable to mechanical failures. Another disadvantage is that the known apparatusses make an oversized and irregular hole in the skin and the underlying layers of fat and meat, which not only causes yield losses but also make the subsequent steps of automatic processing more difficult and less efficient.

Although, when cutting out the vent, it would therefor be desirable to make the hole in the bird as small as possible, it is even more important to make sure that the so called "rose-bud", which is a gland connected with the gut and lying directly under the vent between the gut and the tail of the fowl, is cut out together with the vent. According to the official regulations the rose-bud, the scientific name of which is "Purse of Fabricius", must be cut out, since otherwise the shelf life of the processed poultry would be drastically reduced.

Obviously reducing the diameter of the knife would result in a smaller hole in the bird, but that would also mean that the bird and the knife must be very accurately positioned relative to each other when the center pin is inserted and during the cutting operation to ensure that the rose-bud and the vent are correctly removed.

Most of the known apparatusses have two cooperating positioning members, one of which grips the breast of the bird and pushes it under the cutting unit, whereas the other member acts as an abutment for the back of the bird, so that the vent opening comes to lie in the center line of the center pin of the knife. The first member may be a stationary guide bar or a pivotable member moving along with the overhead conveyor and pressing against the breast of the bird in it's upper or lower position, whereas the second member usually consists of a counter pressure plate moving along with the conveyor, which carries the fowl.

The use of a counter pressure plate like that has the disadvantage that the distance between the plate and the center line of the center pin and the knife must with great accuracy lie within very narrow limits. If this distance is chosen so small that the rose-bud will fall within the diameter of the knife with absolute certainty, the danger exists that the tail of the bird will hinder inserting the center pin into the vent opening or that the knife will cut into the spine of the bird when the vent is cut out. If on the other hand, to avoid this danger, the distance is increased the knife may miss the rose-bud so that it will not be cut out. This means that a compromise is necessary with the result that already a relatively small variation in the size of the birds will cause the choosen distance to be too small or too large.

In trying to solve this problem it has already been proposed to tilt the bird during the cutting operation by first positioning the bird so that the knife will enter the bird at an angle in the direction of the bird's spine in order to cut out the rose-bud, after which the bird is quickly tilted back before the knife reaches the spine, so that the knife penetrates the bird in parallel with the spine. Although this avoids that the tail gets in the way when the center pin of the knife is inserted, the danger of cutting into the spine remains or even increases, since in practice it is very difficult to pick the right moment for tilting the bird back and all the more so because this moment varies with the size of the birds. Apart from that additional means for tilting the bird make the apparatus complicated, vulnerable and expensive.

SUMMARY OF THE INVENTION

It is therefor the principal object of the invention to solve the problems hereinbefore described and to provide an an apparatus of comparatively simple construction, for cutting out the vent of fowl without damage to the viscera, wherein the use of vacuum or compressed air is avoided and which will with certainty cut out the rose-bud together with the vent and at the same time make but a relatively small and regularly shaped hole in the bird.

According to the invention this object is realized with an apparatus of the kind refered to, in which the knife is carried on the free end of a hollow driving shaft, which is rotatably but axially immovably mounted on the center pin, the tip of which protrudes from the knife in an initial position thereof, and in which the knife is movably coupled with the hollow driving shaft by means of a pin radially extending from the shaft into a helical slot of the knife, so that when the driving shaft starts rotating, the knife first axially moves from the initial position over the tip of the center pin, which has been inserted into the vent opening of a bird, and then rotates with the shaft for cutting out the vent. This has the advantage of a very simple construction which enables the knife to be axially moved relative to the center pin without the need for additional control means. Another advantage is, that because the knife shoots down over the tip of the center pin with a high velocity, a small regularly shape hole is cut in the bird, since the relative tough skin does not have time to adapt itself to or stretch away from the knife.

Advantageously when cutting out the vent, the center pin is rotated in the opposite direction from the rotation of the knife and the tip of the center pin is provided with a radially extending helical rib, gradually sloping upwards from the end of the tip, the largest diameter of the rib being smaller than the inner diameter of the knife. This has the advantage that the helical rib of the rotating center pin slightly pulls up the vent towards the knife and also restrains the vent in such manner that it will not rotate with the knife once it is cut out.

Preferably the rotational speed of the knife is many times greater than the speed of the center pin since for pulling up the vent a single revolution of the pin is sufficient and for restraining the vent no greater speed is necessary, whereas the cutting action of the knife improves with the speed thereof.

In a preferred embodiment of the invention, the revolving apparatus cooperates with an overhead conveyor with shackles from which the birds to be processed hang by the ankle joints, and is provided with at least one cutting unit carried by a slide block, which moves along with the conveyor and is movable towards and away from a bird carried by a conveyor shackle, and means being provided for controlling the movements of the slide block and the rotation of the center pin and the knife in such manner, that as the slide block moves towards the bird the center pin already rotates when the tip thereof is inserted into the bird's vent opening and afterwards the knife is rotated for cutting out the vent, after which the rotation of the center pin and the knife is stopped and the slide block is moved away from the bird, so that the cut out vent, which is locked between the helical rib and the knife, is pulled out of the bird together with the gut attached thereto, and finally the vent is released by moving the knife back to the initial position. Because the center pin starts rotation earlier than the knife, the vent is slightly pulled upwards before the knife shoots out and is also ensured that the vent is already restrained even before the knife starts cutting. Since the vent and the gut attached thereto are pulled out of the bird before the vent is released, the vent will not fall back into the bird, but will come to hang down from the gut outside the bird.

Advantageously an abutment member, which moves with the slide block, extends between the legs of the bird and adapts the length of the movement of the slide block towards the bird, is pivotably connected with the slide block and in the lower position thereof is swung down between the legs unto the breast of the bird, so that the bird is pushed under the cutting unit.

In another embodiment of the invention the center pin has two or more hook-shaped protrusions, which as the tip of the pin is inserted into the vent opening grasp the vent, and the center pin is coupled with the hollow driving shaft by means of a friction coupling, so that the center pin rotates with the hollow shaft until the protrusions are hooked into the vent, after which they hold the vent as it is cut out.

In an apparatus for cutting out the vent of a fowl, having two positioning members for positioning the vent and the center pin of the knife relative to each other, according to the invention means are provided for controling the movements of these positioning members, which are both movable, in such manner that the first member pushes the bird under the cutting unit with the vent opening past the center line of the center pin, whereas the second movable member briefly comes to bear on the back of the bird, directly below the tail, at the moment the center pin and/or the knife is inserted, so that the bird is briefly pushed back and the vent opening comes to lie directly in the center line of the center pin, and the rosebud is brought within the diameter of the knife, respectively. This has the advantage that when the bird is briefly pushed back, the tip of the center pin has already past the tail, so that the tail will not hinder the insertion of the center pin. Preferably the second positioning member releases the bird again, directly after the center pin is inserted, so that as the pin further penetrates the centering action thereof is fully exploited and moreover, damage to the gut is avoided. It is also prefered that the second member again releases the bird directly after the rose-bud is cut out, after which the relative freedom of movement of the bird further reduces the danger of cutting into the bird's spine.

Preferably the second positioning member is a thin bracket pivotable about a vertical axis, which when it passes a stationary adjustable abutment is pushed against the back of the bird by the abutment. This allows for a very simple construction and thanks to the adjustability of the abutment the timing and the duration of the pressing action of the second member as well as the strength of the pressure exerted therby are adjustable with great precision.

In an apparatus of the type that for each cutting unit has a hook-shaped abutment member, which extends between the bird's legs and moves with the side block, so to adjust the downward movement of the block to the size of the bird, the second positioning member preferably is associated with the loop-shaped abutment member, so that irrespectively of the size of the bird, the second member will always contact the back of the bird directly below the tail.

BRIEF DESCRIPTION OF THE DRAWINGS

Further features and advantages of the invention will become apparent from the following description of a prefered embodiment of the invention, taken in connection with the accompanying drawings, in which:

FIG. 9 is an enlarged detail of FIG. 1;

FIG. 10 is a cross sectional view taken along the line X—X in FIG. 11; and

FIG. 11 is a cross sectional view taken along the line XI—XI in FIG. 9.

DETAILED DESCRIPTION OF THE PREFERED EMBODIMENT

Figure 1:
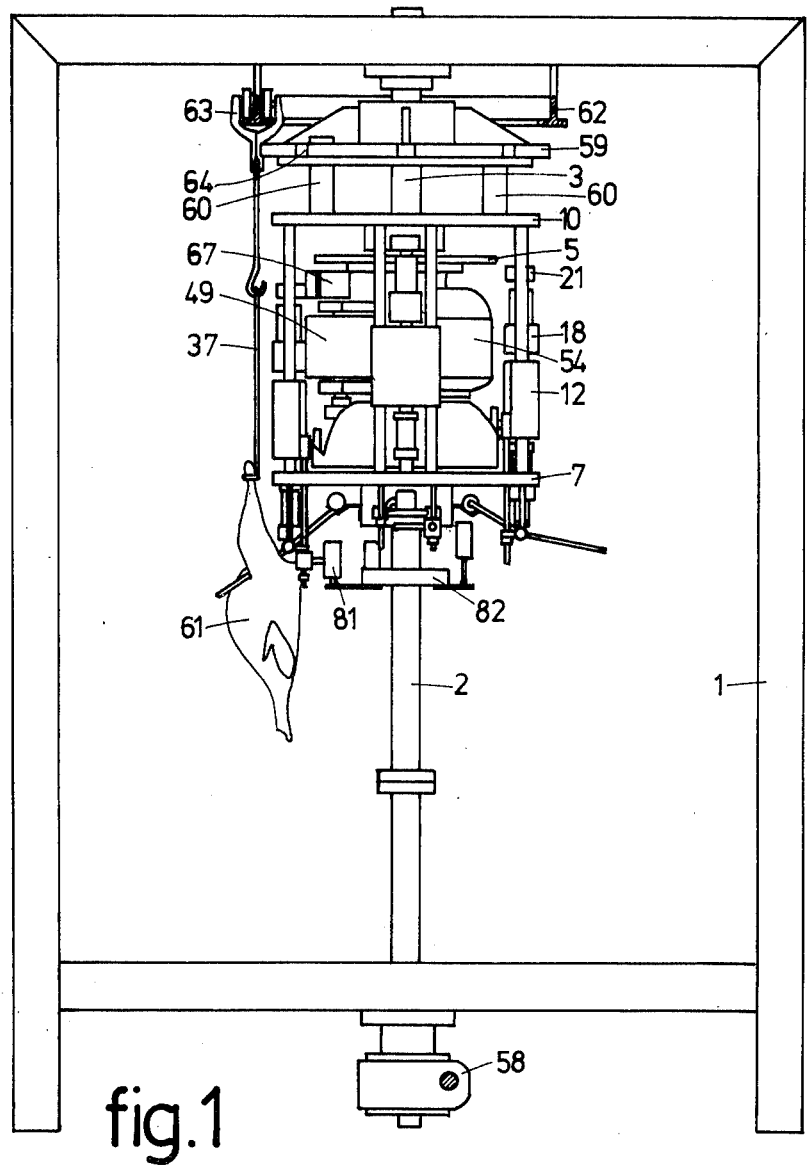
FIG. 1 is a side view of an apparatus according to the invention.

The apparatus for cutting out the vent of fowl shown in the drawings has a tubular frame 1 and a vertical discontinuous not rotatable central shaft, consisting of a lower shaft 2 and an upper shaft 3. On the upper end of the lower shaft 2 a horizontal circular plate 4 is fixed, and at a distance over the plate 4 a second horizontal circular plate 5 is fixed on the lower end of the upper shaft 3. The plates 4 and 5 are interconnected by means of a vertical brace 6 excentrically attached between the plates 4 and 5. Slightly spaced below the lower plate 4 a horizontal circular support 7 is rotatably mounted on the lower shaft 2 by means of bearings 8, whereas similarly slightly spaced over the plate 5 a second horizontal circular support 10 is rotatably mounted on the upper shaft 3 by means of bearings 9. The supports 7 and 10 are interconnected by means of a plurality of pairs of guide bars 11 regularly spaced between the supports near the edge thereof. On each pair of vertical guide bars 11 a slide block 12 is slidably mounted by means of bushings.

Each slide block 12 carries a cutting unit with a hollow shaft 14, rotatably but axially immovably mounted in a vertical bore of the block by means of bearings 15 and locking rings 16. On the upper end of the shaft 14, which protrudes from the block 12 a drive roll 18 is fixed.

Through the central bore of the hollow shaft 14 a center pin 19 passes, the upper end of which is fastened within the stem 20 of a second drive roll 21, overlying the drive roll 18. The stem 20 is rotatably mounted within a central bore in the upper part of the drive roll 18, by means of bearings 22.

Figure 5:
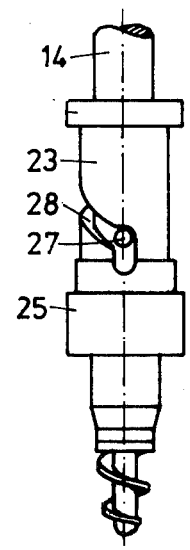
FIG. 5 is a side view of the cutting head shown in FIG. 4.

On the lower part of the hollow shaft 14, protruding from the slide block 12, a sleeve 23 is movably mounted by means of slide bearings 24. The sleeve 23 carries a hollow cylindrical knife 25, and at its upper end is provided with a flange 26. The sleeve 23 is coupled with the hollow shaft 14 by means of a pin 27 attached to the shaft 14 and laterally extending into a helical slot 28 of the sleeve 23, as is most clearly shown in FIG. 5.

The lower part of the center pin 19 protruding below the hollow shaft 14, is provided with a flange 29, which over a bearing ring 30 bears against the lower end of the shaft 14. Below the flange 29 the tip of the center pin 19 has an external helical rib 31, which gradually widens in the direction of the flange 29. The lower support 7 is provided with an opening for the sleeve 23 and the knife 25.

The slide block 12 has on the backside two fittings 32 with threaded holes into which rods 33 are fastened, which extend downwardly through corresponding holes in the lower support 7.

Figure 4:
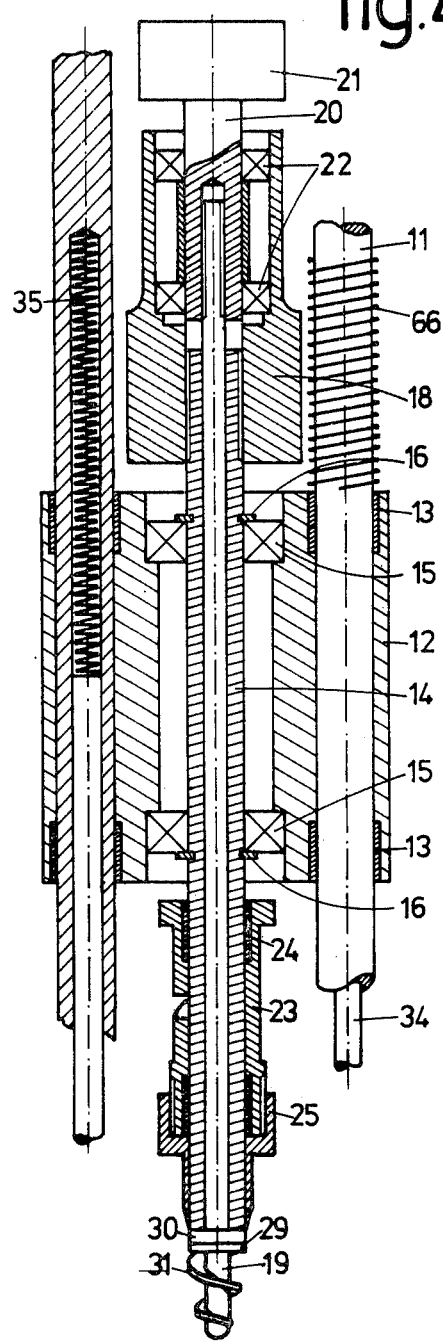
FIG. 4 is an enlarged cross sectional view taken along the line IV—IV in FIG. 3.

The lower part of each guide bar 11, as shown in FIG. 4, is provided with a central bore in which a rod 34 is slidably received. The rod 34 extends downwardly through an opening in the lower support 7. Within the bore of the guide bars 11 a spring 35 is provided, which pushes down the rod 34. The rods 34 at their lower ends are each provided with a backwardly extending arm carrying an eye 36, which is slidable along the corresponding rod 33 lying directly behind the rod 34. The legs of a radially outwards extending loop-shaped abutment member 38 are pivotably connected to the lower ends of the rods 34 by means of pivots 39. One of the legs of the abutment member 38 has an extension 40, which carries a follower roll 41 which bears on an arm 42 rigidly attached to the support 7. Each rod 34 is provided with an adjustable abutment flange 43 below the eye 36, so that as the slide block goes up together with the eyes 36, the pivots 39 of the abutment member 38 and the rods 34 are lifted by the abutment flanges 43, the follower roll 41 moves along the arm 42 towards the shaft 2 and the abutment member 38 assumes a horizontal position.

The eye 36 opposite the extension 40 of the abutment member 38, carries a sleeve 75, which has a laterally extending positioning bracket 76, and is pivotably mounted on the corresponding rod 33, as is most clearly shown in FIGS. 9 and 11. The bracket 76, which is preferably made of sheet material has a recess 77 in the front adge, corresponding with the shape of the back of a fowl, whereas at the back edge the bracket has a bearing surface 78.

Figures 2, 3:
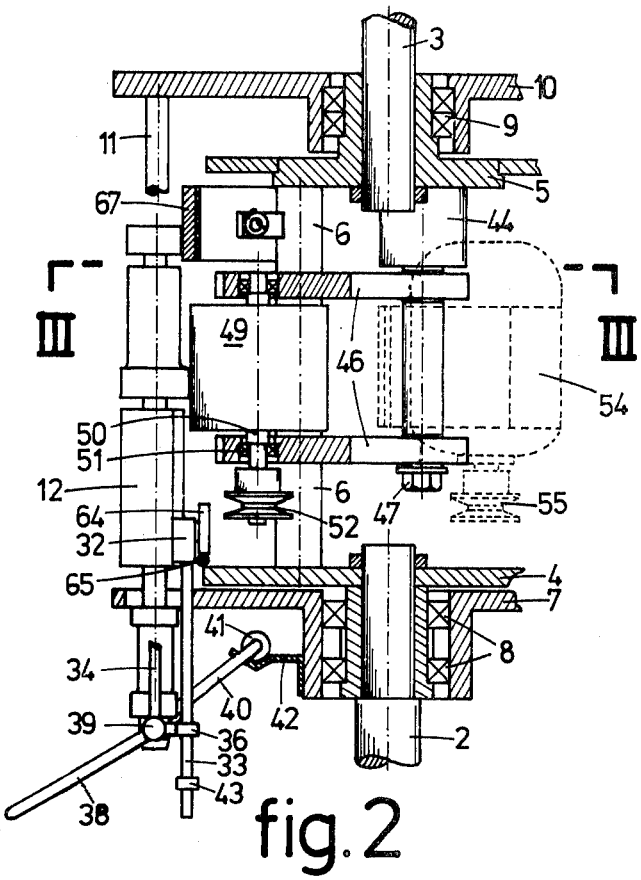
FIG. 2 is an enlarged detail of FIG. 1, partially in cross section taken along the line II—II in FIG. 3.
FIG. 3 is a cross sectional view taken along the line III—III in FIG. 2.

Referring now to FIGS. 2 and 3, a downwardly extending shaft 45 is rotatably but axially immovably mounted in a bearing assembly 44 fixed to the bottom surface of the upper circular plate 5. Two horizontal arms 46 are fixed to the shaft 45 and a sleeve 48 is mounted on the shaft 45 and clamped between the arms 46 by means of a nut 47 threaded on the lower end of the shaft 45. Between the free outer ends of the arms 46 a drive roll 49 is mounted, the vertical shaft 50 of which is journalled in bearings 51 mounted in the arms 46. Below the lower arm 46 a pulley 52 is fixed on the lower end of the shaft 50.

A vertical support plate 53 is attached to the sleeve 48 and supports a motor 54, the output shaft of which is provided with a pulley 55 which is coupled with the pulley 52 of the drive roll 49 by means of a belt. Between bracket respectively fixed to the upper arm 46 and the vertical brace 6, a spring 56 is mounted, which urges the upper arm 46 against an justable abutment 47 on the support 6. Since the sleeve 48 is clamped between the arms 46, the arms 46, the drive roll 49 and the motor 54 are rotatable as a unit about the axis of the shaft 45.

The lower central shaft 2, together with the upper shaft 3, which is slidably mounted in the frame 1 and coupled with the lower shaft 2 by means of the plates 4 and 5 and the brace 6, is adjustable in height by means of a hand operated winch 58 mounted on the frame 1. The top beams of the frame 1 support a rotatable horizontal driving wheel 59, mounted concentrically with the upper shaft 3, for which it is provided with a through let opening. The driving wheel 59 is coupled with the upper support 10 by means of two vertical bars 60, the lower ends of which are fixed to the support 10, whereas the upper parts of the bars 60 are slidebly received in appropriate openings in the driving wheel 59.

The apparatus hereinbefore described operates as follows:

A bird 61 hanging by the ankle joints from an overhead conveyor shackle 37 is brought to the apparatus by the conveyor, part of the track 62 of which is concentric with the driving wheel 59 and attached to the frame 1. The trolleys 63 are, as shown in FIG. 1, received in notches 64 made in the circumference of the driving wheel 59, so that the driving wheel is taken along by the conveyor. Thus the supports 7 and 10 coupled with the driving wheel 59 and all the parts associated with the supports will revolve about the central shaft 2, 3 of the apparatus. The slide blocks 12, which each have a follower roller 64 on the back surface bearing on a stationary curve track 65, mounted on the lower circular plate 4, will as they revolve about the central shaft slide up and down along the guide bars 11 in accordance with the shape of the curve track 65. The follower rollers of the slide blocks 12 are pressed down on the curve track 65 by springs 66, which are mounted on the guide bars 11 between the slide blocks 12 and the upper support 10. One of these springs 66 is shown in FIG. 4.

When by means of the winch 58 the height of the shafts 2 and 3 has been correctly adapted to the mean size of the birds to be processed, the loop-shaped abutment member 38, extending horizontally from a slide block 12, will in the slide block's uppermost position, be bought between the legs of the approaching bird 61. As the bird is moved on by the conveyor the slide block 12 will move along with the conveyor and at the same time slide down along it's slide bars 1 so that the follower roll 41 will swing down the abutment member 38 between the legs of the bird 61, about the pivots 39, onto the breast of the bird, thereby pushing the bird 61 under the cutting unit with it's vent opening 79 past the center line of the center pin 19. As soon as the abutment member 38 abuts on the bird 61 the springs 35 in the slide bars 11 will be compressed, so that the downward movement of the slide block 12 will be stopped when the force exerted by the springs 35 equals the force exerted by the springs 66 urging the slide block 12 down. In this manner the downward movement of the slide block 12 is automatically adapted to the size of each individual bird and the penetration depth of the center pin 19 and the knife 25 will always be the same, regardless of the size of the bird 61.

Just before the tip of the center pin 19 reaches the bird, but after the tip of the center pin 19 has been moved down past the tail 80 of the bird 61, the bearing surface 78 of the bracket 76 reaches a stationary abutment roller 81, which is adjustably mounted on the lower shaft 2 by means of a clamping ring 82. The roller 81 swings the bracket 76 against the back of the bird 61 just below the tail 80, as shown in FIG. 10, and the bracket 76 pushes the bird 61 back towards the abutment member 38, so that the vent opening 39 will come to lie in the center line of the center pin 19 just before the tip thereof is inserted into the vent opening 79.

Just before the tip of the center pin 19 is inserted the drive roll 21 reaches a stationary friction track 67 attached to the brace 6 and concentric with the shaft 3, after which the drive roll 21 rolls along the track 67, so that the center pin 19 starts to rotate, and as the tip of the center pin is inserted into the vent opening the vent is pulled up over the helical rib 31 of the pin 19.

In the meantime the bracket 76 has completely past the abutment roller 81 and has therefore released the bird 61, so that the vent may be freely centered by the center pin 19.

The drive roll 18 of the hollow shaft 14 then reaches the driving roll 49 driven by the motor 54, so that the shaft 14 starts to rotate with great speed in a direction opposite to the rotational direction of the center pin 19.

Just before the shaft 14 starts to rotate the bearing surface 78 of the bracket 76 reaches another adjustable stationary abutment roller, so that again the bird 61 is pushed back and the rose-bud 83 is brought within the diameter of the knife 25, as shown in FIG. 10.

As soon as the hollow shaft 4 starts to rotate, the pin 27 of the shaft 14 extending into the slot 28 of the sleeve 23 will quickly slide the sleeve 23 and the knife 25 attached thereto, down over the tip of the center pin 19, so that the vent is cut out together with the rose-bud 83 by the knife 25. The friction between the tip of the center pin 19 and the vent will prevent the vent from rotating with the knife after the vent is completely cut out.

By the time the rose-bud is cut out the bracket 76 has completely past the second stationary roller so that the bird is released again and gains sufficient freedom of movement to prevent that the knife 25 cuts into the spine of the bird as it further penetrates into the bird 61.

The knife 25 will then stop rotating since the drive roll 18 has passed the driving roll 49, and the drive roll 21 of the center pin 19 reaches the end of the friction track 67, so that the center pin stops rotating as well.

The slide block 12 then moves up, so that the vent, which is locked between the rib 31 of the center pin 19 and the knife 25, is pulled out of the bird 61 together with the gut attached thereto, after which the bracket 76 passes another stationary abutment, which acts on a pin 84 on the sleeve 75, thereby swinging the bracket 76 all the way back, ready for handling another bird.

Figure 7:
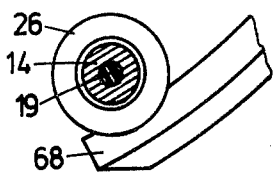
FIG. 7 is a cross sectional view taken along the line VII—VII in FIG. 6.
Figure 6:
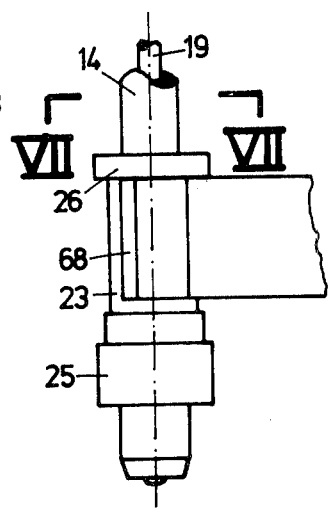
FIG. 6 is a side view of the cutting head in FIG. 5, shown in shot-out position.

Finally the slide block 12 is briefly moved down again in order to bring the flange 26 of the sleeve 23 into contact with another stationary friction track 68, shown in FIGS. 6 and 7, thereby moving the knife back to the initial position and also releasing the vent, which then, as the slide block 12 is moved all the way up and the bird is removed from the apparatus by the conveyor, is pulled from the center pin 19 and comes to hang down over the back of the bird at the end of the gut.

Figure 8:
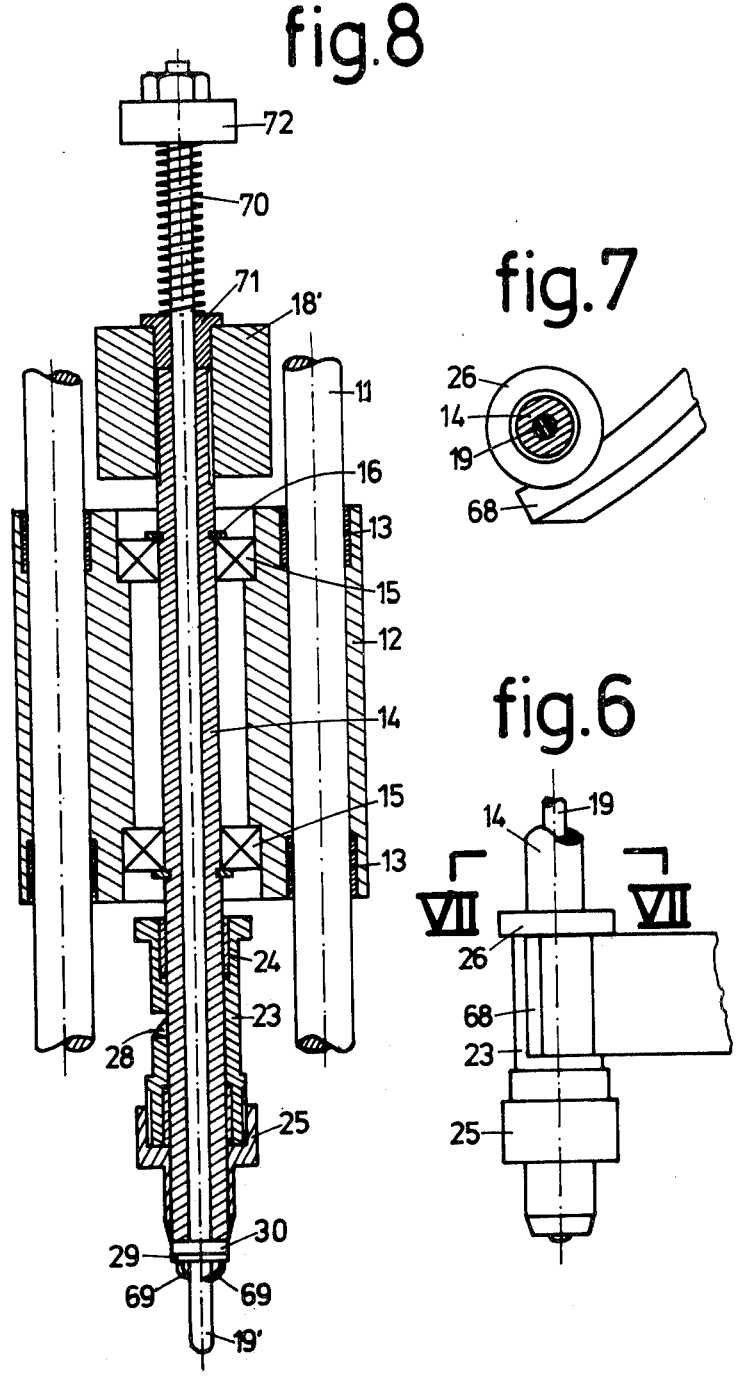
FIG. 8 is a cross sectional side view similar to FIG. 4, of a different type of cutting unit.

In FIG. 8 a different cutting unit is shown, in which the rib 31 of the center pin 19 has been replaced by two hook-shaped protrusions 69 on the lower surface of the flange 29 of the center pin, and the center pin 19 is coupled with the hollow shaft 14 by means of a friction coupling, consisting of a spring 70, mounted between the bearing sleeve 71 of a shorter drive roll 18 and an adjustable flange 72 at the upper end of the center pin 19.

The only difference in operation between an apparatus equiped with cutting units of this kind and the apparatus described hereinbefore, is that as the slide block 12 moves down the protrusions 69 come to rest on the vent and grip the meat of the vent when the center pin 19 is coupled with the rotating hollow shaft 14 by the friction coupling. As soon as the resistance of the vent overcomes the coupling force of the friction coupling the center pin stops rotating and holds the vent as the knife 25 shoots out. After the vent is cut out the knife 25 stops rotating, the vent is pulled out of the bird by the center pin and the knife is brought back to the initial position in the manner described before. Finally the center pin is counter-rotated by the flange 72 cooperating with a stationary friction track similar to the track 67 when the vent is pulled free from the center pin 19.

It will be clear that although in FIGS. 2 and 3 only one and in FIG. 1 only three cutting units are shown, preferably the apparatus is provided with a larger number of cutting units, like f.i. ten.

Thanks to the simple construction of the cutting unit and the simple manner in which it is driven, the principle of the outshooting knife and the center pin which holds the vent against rotating with the knife, is readily adaptable for use with a manually operated apparatus, like a so called vent-gun, in order to avoid the use of vacuum for holding the vent.

Finally it will be understood that the pivotable positioning bracket 76 may be successfully used with any type of automatic vent cutting machine with hollow cylindrical knifes rotatable about a center pin, regardless of the manner in which the knife and center pin are driven and/or moved.

I claim:

1. Apparatus for cutting out the vent of a fowl, comprising:
a frame; and
a cutting means supported by said frame;
said cutting means comprising:
a center pin adapted to be inserted into the vent opening of said fowl;
a hollow cylindrical knife concentrically rotatable about said center pin and axially reciprocatable relative thereto;
driving means for rotating said knife; and
a hollow shaft rotatably but axially immovably mounted on said center pin and connected with said driving means; said knife being carried by said hollow shaft and coupled therewith by means of a pin laterally extending from said hollow shaft and being received in a helical slot in said knife, so that when said hollow shaft starts rotating, said knife shoots out from an initial position relative to said center pin in which the tip of said center pin protrudes from said knife, over said tip of said pin.

2. Apparatus for cutting out the vent of a fowl, comprising:
a frame; and
a cutting means supported by said frame;
said cutting means comprising:
a rotatable center pin, adapted to be inserted into the vent opening of the fowl;
a hollow cylindrical knife concentrically rotatable about said center pin and axially reciprocatable relative thereto;
driving means for rotating said center pin and said knife in opposite directions; and
means for axially reprocicating said knife relative to said center pin between a first position in which the tip of said center pin protrudes from said knife and a second position in which said tip of said center pin completely lies within said knife.

3. Apparatus according to claim 2, in which said tip of said center pin is provided with an external helical rib gradually sloping upwards from the free end of said tip, the greatest diameter of which is less than the internal diameter of said knife.

4. Apparatus according to claim 3, in which said driving means are adapted to rotate said center pin at a speed substantially less than the rotational speed of said knife.

5. Apparatus for cutting out the vent of fowl, cooperating with an overhead conveyor with shackles from which the birds to be processed are hanging by the ankle joints, comprising:
a frame;
at least one slide block mounted in said frame for moving along in synchronisation with said conveyor and being reciprocatable towards and away from a bird carried by a said conveyor shackle;
means for reciprocating said slide block; and
a cutting unit carried by said slide block;
said cutting unit comprising:
a rotatable center pin, the tip of which is adapted to be inserted into the vent opening of said bird as the slide block moves down towards said bird;
a hollow cylindrical knife concentrically rotatable about said center pin and axially reciprocatable relative thereto;
driving means for rotating said center pin and said knife in opposite directions;
means for axially reciprocating said knife relative to said center pin, between a first position in which said tip of said center pin protrudes from said knife and a second position in which said tip of said center pin lies completely within said knife;

said tip of said center pin being provided with an external helical rib gradually sloping upwards from the free end of said tip, the greatest diameter of which is less than the internal diameter of said knife.

6. Apparatus according to claim 5, further comprising means for controlling the movements of said slide block and said cutting unit in such manner, that as said slide block moves towards said bird said center pin already rotates when said tip thereof is inserted into said vent opening before said knife is rotated and shoots out for cutting out the vent of said bird, after which the rotation of said center pin and said knife are stopped and said slide block is moved away from said bird, so that the cut out vent, which is locked between said helical rib and said knife, is pulled out of said bird together with the gut attached thereto, and finally said vent is released by moving said knife back to said first position relative to said center pin.

7. Apparatus according to claim 5, further comprising:
a generally loop-shaped abutment member pivotably connected to said slide block and extending between the legs of said bird, so that as said slide block moves down towards said bird, said abutment member comes to bear on the crotch of said bird, thereby limiting and adapting said downward movement of said slide block to the size of said bird; and
means for pivoting said abutment member down onto the breast of said bird, thereby pushing said bird under said cutting unit.

8. Apparatus for cutting out the vent of fowl, cooperating with an overhead conveyor with shackles from which the birds to be processed are hanging by the ankle joints, comprising:
a frame;
at least one slide block mounted in said frame for moving along in synchronisation with said conveyor and being reciprocatable towards and away from a bird carried by a said conveyor shackle;
means for reciprocating said slide block; and
a cutting unit carried by said slide block;
said cutting unit comprising:
a rotatable center pin, the tip of which is adapted to be inserted into the vent opening of said bird as said slide block moves down towards said bird;
a hollow cylindrical knife concentrically rotatable about said center pin and axially reciprocatable relative thereto;
driving means for rotating said center pin and said knife;

means for axially reciprocating said knife relative to said center pin, between a first position in which said tip of said center pin protrudes from said knife and a second position in which said tip of said center pin completely lies within said knife;

said tip of said center pin being provided with two or more hook-shaped protrusions, adapted to grip the meat of the vent of said bird as said tip is inserted into said vent opening; and said center pin being coupled with said knife by means of a friction coupling.

9. Apparatus according to claim 8, further comprising means for controling the movements of said slide block and said cutting unit in such manner, that as said slide block moves down towards said bird said knife is rotated and moved towards said second position for cutting out the vent, after said tip of said center pin has been inserted into the vent opening of said bird and said protrusions have come to bear on the vent, said center pin being coupled with said knife by means of said friction coupling first rotating with said knife and being stopped as the resistance of said vent overcomes the coupling force of said friction coupling, after which the rotation of said knife is stopped and said slide block is moved away from said bird, so that the cut out vent held by said protrusions is pulled out of said bird together with the gut attached thereto, and finally the vent is released by moving said knife back to said first position and counter rotating said center pin.

10. Apparatus according to claim 8, further comprising:

a generally loop-shaped abutment member pivotably connected to said slide block and extending between the legs of said bird, so that as said slide block moves down towards said bird, said abutment member comes to bear on the crotch of said bird, therby limiting and adapting said downward movement of said slide block to the size of said bird; and means for pivoting said abutment member down onto the breast of said bird, thereby pushing said bird under said cutting unit.

11. Apparatus for cutting out the vent of fowl, cooperating with an overhead conveyor with shackles from which the birds to be processed are hanging by the ankle joints, comprising:

a frame;

at least one slide block mounted in said frame for moving along in synchronisation with said conveyor and being reciprocatable towards and away from a bird carried by a said conveyor shackle;

means for reciprocating said slide block;

a cutting unit carried by said slide block;

said cutting unit comprising:

a center pin adapted to be inserted into the vent opening of said bird as said slide block moves towards said bird;

a hollow cylindrical knife concentrically ratatable about the center line of said center pin; and driving means for rotating said knife; and positioning means for positioning said bird relative to said cutting means;

said positioning means comprising a first positioning member adapted to bear on the breast of said bird, and a second positioning member adapted to bear on the back of the bird;

means for moving said positioning members towards and away from said bird; and means for controlling the movements of said positioning members in such manner that said first positioning member pushes said bird under said cutting unit with the vent opening past the center line of said center pin, whereas said second positioning member briefly comes to bear on the back of said bird, directly below the tail thereof, at the moment said center pin and/or said knife is inserted into said bird, so that said bird is briefly pushed back and the vent opening comes to lie exactly in the center line of said center pin, and the rose-bud (or Purse of Fabricius) is brought within the diameter of said knife, respectively.

12. Apparatus according to claim 11, in which said second positioning member is a thin bracket pivotably about a vertical axis connected to said slide block and is pressed against the back of said bird as it passes a stationary abutment adjustably mounted in said frame.

13. Apparatus according to claim 12, in which a generally loop-shaped abutment member is connected to said slide block and extends between the legs of said bird, so that as said slide block moves down towards said bird, said abutment member comes to bear on the crotch of said bird, thereby limiting and adapting said downward movement of said slide block to the size of said bird and ensuring that said bracket always comes to bear on the back of said bird directly below said tail, regardless of the size of said bird.

14. Apparatus according to claim 11, in which said first positioning member is a generally loop shaped abutment member pivotably connected to said slide block and extending between the legs of said bird, so that as said slide block moves down towards said bird, said abutment member comes to bear on the crotch of said bird, thereby limiting and adapting said downward movement of said slide block to the size of said bird, and means being provided for pivoting said abutment member down onto the breast of said bird, thereby pushing said bird under said cutting unit.

* * * * *